US005740653A

United States Patent [19]
Dubizhansky

[11] Patent Number: 5,740,653
[45] Date of Patent: Apr. 21, 1998

[54] METHOD FOR GROUTING TILE

[75] Inventor: Leonid Dubizhansky, 8515 Chloe Ave. #208, San Diego, Calif. 92175

[73] Assignee: Leonid Dubizhansky, San Diego, Calif.

[21] Appl. No.: 631,619

[22] Filed: Apr. 10, 1996

[51] Int. Cl.$^6$ .................................. E04F 15/022
[52] U.S. Cl. ..................... 52/747.11; 52/742.16; 52/746.1
[58] Field of Search ................... 52/747.11, 749.11, 52/742.16, 746.1, 315, 389, 390

[56]  References Cited

U.S. PATENT DOCUMENTS 3,735,545  5/1973  Bernett ........................... 52/742.16
4,407,884  10/1983  Witt ............................. 52/747.11 X
4,543,765  10/1985  Barrett .......................... 52/747.11
4,862,668  9/1989  DeGooyer ........................ 52/390 X
5,238,721  8/1993  Nakazawa ....................... 52/390 X

*Primary Examiner*—Christopher Kent
*Attorney, Agent, or Firm*—Brown Martin Haller & McClain Group; Eleanor M. Musick

[57]  ABSTRACT

A method for grouting tile comprises applying a protective coat made of self-adhesive, impenetrable, flexible, sheeting material to the top surface and peripheral sides of the tile before grouting, then removing the protective coat after grouting. The protective coat eliminates contact between the grout and the tile surface, thereby eliminating the need for pre-grouting sealer application, tile washing, tile cleaning, and/or acid cleaning of the tile.

20 Claims, No Drawings

METHOD FOR GROUTING TILE

FIELD OF THE INVENTION

This invention relates generally to a method for grouting tile and more particularly to a method for minimizing contact between the grout and the tile surfaces when grout is applied to spaces between the tiles.

BACKGROUND OF THE INVENTION

Tile is often a practical and aesthetically-pleasing addition to homes, offices, and other public and private areas. However, tile setting can be labor intensive and cause injury to tile setters who engage in repetitive movements during the tile installation process. Also, tile installation is time consuming and costly due to the number of steps and materials that are required to install certain types of tiles. Further, the materials used to seal, wash, and clean the tiles are often toxic and injurious to the health of the tile setter, and consequently, prolonged exposure to these materials may cause a variety of health risks from allergic reactions to debilitating illnesses such as cancer.

Traditional methods of tile installation have not changed significantly. The usual tile setting process includes applying a coat of cement-based material to the surface to be tiled, placing the individual tile pieces with spaces between them, and filling the spaces with grouting material after the cement has cured thereby firmly adhering the tiles to the surface. This seemingly, simple process is complicated by the application of the grouting material and the subsequent clean-up of excess grout, grout haze, and grout film on the tile surface. Installation of tile such as glazed ceramic tile requires considerably less labor and cleaning materials because the grout can not readily penetrate the tile surfaces. In contrast, unglazed tile such as cement pavers, quarry tile, terra cotta, brick veneer, catalan, and cantera/adoquin stones are porous and readily absorb the grouting material causing grout staining, and thus additional steps must be taken to protect the tile surface from the grouting process.

Grouting unglazed floor tile may involve any combination of the following steps: applying grout release, applying sealer stripper, dampening tiles with clean water, smearing grout over the tiles, removing excess grout from the tile surface, washing the tile, shaping the grout joint, cleaning the tile once the tile face is dry, cleaning the tile with acid, wax stripping the tile, and removing acid residue. In a typical process of grouting unglazed floor tile, the pre-grouting sealer is applied to the top surface of the installed tile to protect the tile from staining during the grouting process. After application of the pre-grouting sealer, the tiles are dampened to prevent excess water loss from the grout and to remove dust and dirt which can contaminate the grouting material. The grout is smeared over the tile surface and forced into the spaces between the tiles, and to lessen the work involved in washing the tile after the grout sets, excess grout is removed from the surface of the tile. Because of the severe surface resistance and moisture absorption of various types of unglazed tile, this step is often strenuous and labor intensive.

Once the grout has set in the spaces between the tiles thereby forming grout joints, the tiles are sponge-washed with water two or more times, and simultaneously, the grout joints are shaped. Once the grout has dried, grout haze formed on the tile surface must be removed using a material such as cheesecloth. Further, a grout film which appears on the tile must be removed by a complicated process of acid cleaning that, in itself, requires many steps. Finally, in the majority of grout applications, extra sealer or extra acid cleaner must be stripped from the tile.

The process of grouting unglazed floor tile is complicated, expensive, and time consuming, and may produce low quality results. Improvements to the method of tile installation has appeared in the form of improvements in grouting material composition as disclosed in U.S. Pat. No. 3,735,545 of Bernett, incorporated herein by reference, but which does not eliminate the labor intensive steps of washing and cleaning the tiles. Other solutions focus on protection of the tile surface by impregnating the porous tile with materials such as polymerized plastic and oil as disclosed in U.S. Pat. No. 4,407,884 of Witt, incorporated herein by reference. Although this method greatly improves stain resistance of the porous tile, it does not eliminated any of the time consuming and labor intensive steps of grouting. Another solution eliminates the need for grouting altogether through the use of elastically compressible joint tape as disclosed in U.S. Pat. No. 5,238,721 of Hakazawa, incorporated herein by reference. If properly used, this method may solve many problems of traditional tile installation, however, this method can not be used where water-resistance and tile strength are required.

The traditional method of tile installation requires the application and removal of numerous materials from the tile surfaces, and thus, for a large tiled area, the required manual labor is intensive and time consuming, and as a result, may be cost prohibitive. Further, the quantity of required toxic materials may produce health risks as well as environmental damage. A "non-contact" grouting method that employs a removable, protective coat to prevent contact between the tile surface and the grouting material would eliminate the need for tile surface procedures such as grout release application, extensive tile washing, tile cleaning, and acid cleaning. It is to such a method that the present invention is directed.

SUMMARY OF THE INVENTION

It is an advantage of the present invention to provide a method of tile installation that eliminates contact between the tile surface and grouting material by applying a flexible protective coat on the tile surface before grouting, and removing it after grouting.

It is another advantage of the present invention to provide an easy method of tile installation that employs a flexible protective coat to eliminate the need for tile surface preparation such as grout release application, extensive tile washing, tile cleaning, and acid cleaning.

Still another advantage of the present invention is to reduce traditional grouting health risks including radiculitis, arthritis, bursitis, cervicodynia, epicondylitis, torn meniski, hernia, respiratory tract irritation, dyspnea, wheezing, pulmonary fibrosis, silicosis, nasal irritation, pulmonary tuberculosis, eye watering, irritation of the mouth and throat, lung abscess and lung cancer which persist due to use of chemicals, breathing the grout dust, and repetitious manual labor.

Further advantages of the present invention are the time savings and lowered costs of the non-contact grouting method which requires comparatively minimal processes and less materials than the traditional grouting method.

Yet another advantage of the present invention is to provide accurate, high quality grouting by eliminating the use of grouting chemicals. Common problems in traditional grouting include tile etching, pigment staining, efflorescence, and grout discoloration which are caused by improper selection and/or improper use of chemicals such as grout releases or acid cleaners.

In an exemplary embodiment of the present invention contact between the tile surface and the grouting material is eliminated by applying a flexible protective coat to the surface and peripheral sides of each tile before installation of the tiles. The application of the protective coat may occur as a final step of the tile production process, or as a preparation step by the tile setter, prior to installation of the tile. After installation of the surface-protected tiles, grouting material is poured into the spaces between the tiles. Finally, when the grout has set firmly in the spaces forming grout joints, the protective coat is removed from the individual tile surfaces, and the grout joints are shaped with cheesecloth. In an alternate embodiment of the present invention the flexible protective coat is applied after tile installation. Rolls of flexible plastic film are applied to the tile area by covering the tiles and the spaces between the tiles. The protective film is removed from the spaces between tiles using a tool such as a soldering iron which is slid down the middle of the spaces between tiles to fuse the film in a manner that eliminates the film between the tiles while maintaining a film edge extending beyond the surface of the individual tiles. The film edge prevents grout penetration under the film and varies in width depending on the shape and thickness of the tile. Grouting material is poured into the spaces between the tiles, and the grout, by its own weight, attaches the film edge to the sides of the tiles. When the grout joint has set, the protective coat is removed from the tile surface, and the grout joints are shaped with cheesecloth.

DETAILED DESCRIPTION OF THE PREFERRED EMBODIMENTS

The present invention provides a method of grouting tiles that eliminates contact between the grout and tile surface by covering the individual tile surfaces with flexible protective coat before grouting. The method comprises the steps of: applying a flexible protective coat on the tile surface, removing the protective coat from the spaces between tiles, pouring the grout over the covered tile surfaces into the spaces between tiles, removing the protective coat from the tiles, and shaping the grout joints.

The protective coat of the preferred embodiment should meet minimum requirements of easily sticking to tile surface, staying on the tile during the grouting process without moving or tearing, being impenetrable to liquids, being easily removable from the tile after grouting, and leaving no trace of adhesive on the tile. In the preferred embodiment, flexible plastic film such as non-skid polyethylene film with a pressure sensitive adhesive applied to one side and a thickness from 0.01 mm (1/2000 in.) to 6.35 mm (1/4 in.) is the most suitable material as a protective coat. Application of the film to the tile is facilitated by using an adhesive film rolled with a reverse roll configuration. One type of flexible plastic film that may be used is acrylic polymer coated polyethylene film with a thickness of 0.01 mm (2-mils). In other embodiments, different materials may be used as the protective coat including pre-glued impenetrable paper such as washable wallpaper, vinyl self-stick material, pre-glued oilcloth, and pre-glued leather.

The present invention is further illustrated by the aid of two non-limiting examples of the preferred embodiments. Example 1 describes a method of tile installation wherein the flexible plastic film is applied before tile installation, and Example 2 describes a method wherein the flexible plastic film is applied after the tile installation.

EXAMPLE 1
Applying Flexible Plastic Film Before Tile Installation

Example 1 illustrates an embodiment wherein the flexible plastic film is applied to the individual tiles before the tiles are installed. The film is applied to the top surface of each tile as a final step of a tile production process when the tiles are cold, and is measured to extend beyond the edges of the tile's top surface by a length that is approximately one-fourth of the tile thickness. The film extending beyond the tile surface, which may be referred to as the "film edge", is bent downward and attached to the sides of tiles. The tiles, which are covered by the flexible plastic film, are packaged by the manufacturer ready for installation using the method of the present invention. Alternatively, boxes of tiles with unprotected surfaces are purchased by the tile setter, and the flexible plastic film is applied to each unprotected tile surface in the setter's workshop or any other suitable site.

Once the individual tiles have been covered with the flexible plastic film at the production plant or by the tile setter, the tiles are installed leaving spaces between the tiles in the conventional manner. The grouting material can then be poured directly into the spaces. Any grouting material which has spilled over from the spaces or has been inadvertently poured onto the protected tile surface does not have to be removed as is common in traditional grouting methods because there is no danger of grout penetration to the tile body or creation of the grout haze on the tile surface.

Once the grout is set after approximately 30 to 50 minutes, a margin trowel is slid over the grout joints to smooth and level the grout joints with the tile edges. After another 2 to 3 hours, when the grout has set firmly in the grout joints, the flexible plastic film is removed using an instrument such as a utility knife. The resulting tile surface is clean and has no grout residue, however, small gaps in the grout will be present at the sides of the tiles where the film was attached. These gaps are readily filled-in by packing the grout tighter in the joints with cheesecloth and/or by adding small amounts of grout of the same dampness.

EXAMPLE 2
Applying Flexible Plastic Film After Tile Installation

Example 2 illustrates an alternate embodiment wherein the flexible plastic film is applied to the entire tiled area including the individual tiles and the spaces between the tiles after the tiles are installed on the subsurface. Rolls of flexible plastic film having widths on the order of 61 cm to 122 cm (2 to 4 feet) wide, are applied on the tiled area so that each row of film overlaps the previously-applied row of film. A pressure sensitive adhesive is used to adhere the film to the top surfaces of the tiles. Overlap is on the order of 12.7 mm (½ in.). The plastic film between the tile spaces is removed by sliding a hot soldering iron down the middle of the space. The size of the soldering iron or soldering iron tip is chosen so that the film is fused from within 1.59 mm (1/16 in.) to 6.35 mm (¼ in.) of the edge of the tile depending on the shape of the tile edges and the thickness of the tiles. The film should not be fused exactly at the tile edges because lack of a film edge will create danger of grout penetration under the film.

After the film has been removed from within the spaces of the tiles, grouting material is poured into the spaces, and the grout, by its own weight, attaches the film edges to the sides of the tiles. As in Example 1, once the grout is set, a margin trowel is slid over the grout joints to smooth and level the grout joints with the tile edges. Subsequently, when the grout has set firmly in the grout joints, the flexible plastic film is removed using an instrument such as a utility knife, and the small gaps in the grout which are present at the sides of the tiles where the film was attached are filled-in by packing the grout with cheesecloth. Small amounts of grout of the same dampness may be added where required to properly shape the joints.

The above-described method provides numerous advantages over conventional grouting techniques, including cost savings in material, tools, and labor, elimination of reliance on hazardous chemicals which create health and environmental risks, reduction in potential damage to tile from caustic or abrasive materials, improved uniformity in tile surface and grout, and universality in its application to all types of tiles and grout.

It will be evident that there are additional embodiments which are not illustrated by example but which are clearly within the scope and spirit of the present invention. Therefore, the above examples are intended to be exemplary only, and the scope of the invention is to be limited solely by the appended claims.

I claim:

1. A method for forming grout joints in a tiled area having a plurality of tiles installed on a subsurface, each tile of said plurality of tiles having a top surface, a plurality of side surfaces, and a plurality of spaces with one space adjacent each side surface of said plurality of side surfaces, said method comprising:

applying a flexible protective coat on each of said plurality of tiles, said flexible protective coat having an edge extending beyond said top surface;

pouring a grouting material into said plurality of spaces and onto at least a portion of said edge of said flexible protective coat;

removing said flexible protective coat from said top surface of each said tile; and shaping said grouting material within said plurality of spaces to form said grout joints.

2. The method for forming grout joints as in claim 1, wherein the step of applying a flexible protective coat comprises applying said flexible protective coat to said top surface of each said tile prior to installation on said subsurface.

3. The method of forming grout joints as in claim 1, wherein said plurality of tiles are already installed on said subsurface, and wherein said flexible protective coat comprises a sheet of protective material covering at least a portion of said tiled area, the method further comprising:

removing at least a portion of said flexible protective coat from said plurality of spaces, so that said flexible protective coat remains on said top surface of said each tile with said edge extending beyond said top surface.

4. The method for forming grout joints as in claim 3, wherein the step of removing at least a portion of said flexible protective coat comprises sliding a soldering iron tip across said flexible protective coat above said plurality of spaces.

5. The method for forming grout joints as in claim 1, wherein said flexible protective coat is selected from the group that includes self-adhesive flexible plastic film, pre-glued impenetrable paper, vinyl self-stick material, pre-glued oilcloth, pre-glued leather, and other self-stick impenetrable flexible sheeting material.

6. The method for forming grout joints as in claim 1, wherein said flexible protective coat is a polyethylene film having a pressure sensitive adhesive on one side thereof.

7. The method for forming grout joints as in claim 6, wherein said polyethylene film is an acrylic polymer coated polyethylene film.

8. The method for forming grout joints as in claim 6, wherein said polyethylene film comprises a rolled film having a film width within a range of 61 cm to 122 cm, and a plurality of films are used to cover said tiled area.

9. The method for forming grout joints as in claim 1, wherein said flexible protective coat has a thickness within a range of 0.01 mm to 6.35 mm.

10. The method for forming grout joints as in claim 1, wherein said edge of said flexible protective coat extends into said one space by an amount within a range of 1.59 mm to 6.35 mm.

11. The method for forming grout joints as in claim 1, further comprising the step of bending said edge of said flexible protective coat against said plurality of side surfaces of said each tile prior to or during the step of pouring said grouting material.

12. A method for grouting a plurality of tiles having spaces adjacent each tile of said plurality of tiles, including pouring grouting material into said spaces after the installation of said plurality of tiles on a subsurface, said each tile having a top surface and a plurality of side surfaces, said method comprising:

applying a flexible protective coat to said plurality of tiles, said flexible protective coat having an overhanging edge of a pre-determined width extending beyond said top surface of said each tile;

removing portions of said flexible protective coat that extend beyond said pre-determined width into a space adjacent each tile;

pouring grouting material into each said space and over at least a portion of said overhanging edges so that said grouting material fills each said space to form a plurality of grout joints;

removing said flexible protective coat from each said tile; and shaping said grout joints.

13. The method for grouting as in claim 12, wherein the step of removing portions of said flexible protective coat comprises sliding a soldering iron tip down the middle of each said space.

14. The method for grouting as in claim 12, wherein said flexible protective coat is selected from the group that includes self-adhesive flexible plastic film, pre-glued impenetrable paper, vinyl self-stick material, pre-glued oilcloth, pre-glued leather, and other self-stick impenetrable flexible sheeting material.

15. The method for grouting as in claim 12, wherein said flexible protective coat is a polyethylene film having a pressure sensitive adhesive on one side thereof.

16. The method for grouting as in claim 15, wherein said polyethylene film is an acrylic polymer coated polyethylene film.

17. The method for grouting as in claim 15, wherein said polyethylene film comprises a rolled film having a film width within a range of 61 cm to 122 cm, and a plurality of films are used to cover said tiled area.

18. The method for grouting as in claim 12, wherein said flexible protective coat has a thickness within a range of 0.01 mm to 6.35 mm.

19. The method for grouting a tiled area as in claim 16, wherein said edge of said flexible protective coat extends into said adjacent space by an amount within a range of 1.59 mm to 6.35 mm.

20. The method for grouting as in claim 12, wherein the step of pouring grouting material includes bending said edge of said flexible protective coat toward each side surface of said tile to protect at least a portion of the side surfaces of said each tile.

* * * * *